United States Patent [19]

Norman et al.

[11] Patent Number: 5,631,545

[45] Date of Patent: May 20, 1997

[54] APPARATUS AND METHOD FOR REGULATING A POWER LINE USING FREQUENCY DOMAIN SELF-SYNCHRONIZATION CONTROL

[75] Inventors: Martin I. Norman; Ray S. Kemerer, both of Monroeville, Pa.

[73] Assignee: Electric Power Research Institute, Inc., Palo Alto, Calif.

[21] Appl. No.: 268,762

[22] Filed: Jun. 29, 1994

[51] Int. Cl.[6] ........................................ G05F 1/70
[52] U.S. Cl. .................................. 323/205; 323/210
[58] Field of Search .............................. 323/205, 207, 323/208, 209, 210, 211, 212, 218; 307/102, 105; 364/137; 361/58, 107; 363/39, 97

[56] References Cited

U.S. PATENT DOCUMENTS

| | | | |
|---|---|---|---|
| 4,000,455 | 12/1976 | Gyugyi et al. | 323/119 |
| 4,063,301 | 12/1977 | Lye | 361/88 |
| 4,068,159 | 1/1978 | Gyugyi | 323/119 |
| 4,172,234 | 10/1979 | Gyugyi et al. | 323/119 |
| 4,188,573 | 2/1980 | Gyugyi et al. | 323/119 |
| 4,204,151 | 5/1980 | Guygyi et al. | 323/119 |
| 4,210,860 | 7/1980 | Rosa et al. | 323/119 |
| 4,234,843 | 11/1980 | Guygyi et al. | 323/119 |
| 4,296,462 | 10/1981 | Gurr | 363/96 |
| 4,307,331 | 12/1981 | Guygyi | 323/210 |
| 4,319,329 | 3/1982 | Girgis et al. | 364/484 |
| 4,353,024 | 10/1982 | Gyugyi | 323/211 |
| 4,356,441 | 10/1982 | Putman et al. | 323/210 |
| 4,358,729 | 11/1982 | Hart | 323/322 |
| 4,437,052 | 3/1984 | Gyugyi | 323/210 |
| 4,438,386 | 3/1984 | Gyugyi | 323/210 |
| 4,451,777 | 5/1984 | Gyugyi | 323/210 |
| 4,555,659 | 11/1985 | Gyugyi | 323/210 |
| 4,561,059 | 12/1985 | Davis et al. | 364/477 |
| 4,571,535 | 2/1986 | Gyugyi | 323/211 |
| 4,638,238 | 1/1987 | Gyugyi et al. | 323/211 |
| 4,672,555 | 6/1987 | Hart et al. | 364/483 |
| 4,811,236 | 3/1989 | Brennen | 364/483 |
| 4,891,570 | 1/1990 | Nakamura et al. | 323/210 |
| 4,891,571 | 1/1990 | Wong | 323/322 |
| 5,198,746 | 3/1993 | Gyugyi et al. | 323/207 |
| 5,227,713 | 7/1993 | Bowler et al. | 322/58 |
| 5,305,242 | 4/1994 | Noriyoshi et al. | 364/602 |
| 5,329,221 | 7/1994 | Schauder | 323/207 |
| 5,374,853 | 12/1994 | Larsen et al. | 307/102 |

*Primary Examiner*—Peter S. Wong
*Assistant Examiner*—Adolf Berhane
*Attorney, Agent, or Firm*—Flehr, Hohbach, Test, Albritton & Herbert

[57] ABSTRACT

A frequency domain self-synchronization controller for solid state switches is disclosed. The controller analyzes a measured power signal in the frequency domain to identify a frequency domain firing angle and then converts the frequency domain firing angle to a time-domain firing signal command. The time-domain firing signal command is used to fire selected solid state switches of, for example, a static VAR compensator, precisely when the voltage across the selected solid state switches is at or near zero volts, so that the solid state switches are not damaged. The controller also calculates the line voltage level of the power system and in response to the voltage level it automatically executes either a high voltage coarse line conditioning strategy, a high voltage fine line conditioning strategy, a low voltage coarse line conditioning strategy, or a low voltage fine line conditioning strategy. Each of the line conditioning strategies is used to rapidly accomplish voltage control of the power signal on a cycle-by-cycle basis.

16 Claims, 7 Drawing Sheets

APPARATUS AND METHOD FOR REGULATING A POWER LINE USING FREQUENCY DOMAIN SELF-SYNCHRONIZATION CONTROL

BRIEF DESCRIPTION OF THE INVENTION

This invention relates generally to the control of solid state switches, as may be used in Static VAR Compensators (SVC), to condition power on a transmission line. More particularly, this invention relates to a controller that uses self-synchronized frequency domain control to accurately fire solid state devices according to a rapidly executed control strategy.

BACKGROUND OF THE INVENTION

Voltage sags and swells on distribution power systems present problems to both industrial and residential consumers. The difficulties encountered by industrial consumers of electrical power tend to be manifested as increased costs. These increased costs typically arise from down-time of process control equipment. This down-time is commonly attributable to the tripping of protective equipment. Common examples of industrial process control equipment which protects itself by tripping-off in the presence of a line overvoltage or undervoltage are the induction motor or DC motor drive. These drives control a wide range of commercial processing machinery. The cost of even a short-duration protective trip is significant.

Residential consumers, like industrial consumers, observe problems due to line swells and sags. However, the residential customer is more likely to be concerned with the perception of the power quality than the cost of the power, since short sags or swells typically do not result in a significant cost increase for a residential consumer. The most common indication of poor power quality is noticeable voltage flicker, which can be observed by the naked eye if voltage sags occur at certain rates. In addition, with the increased use of intelligent home appliances such as programmable thermostats, microwave ovens, video cassette recorders, and personal computers, both sags and swells can more easily be noticed in the home since they can cause these devices to malfunction.

The solutions to voltage variations on distribution lines have traditionally focused on voltage regulation by mechanical tap-changing transformers or mechanically switched capacitors and inductors. While both of these methods make it possible to adjust the distribution voltage to a desired level, the speed at which this is done is often unacceptable with the loads encountered on present power systems. Also, due to wear of mechanical devices, a restrictive limit is placed on the number of switching operations which can occur throughout the life of such a regulator. Therefore, rather than correcting the voltage variations due to rapidly changing loads every cycle, these regulators are usually operated only a few times a day, at most, based on expected loads at various times during the day.

Since many loads on a distribution system cause voltage variations on a cycle by cycle basis, and since loads are increasingly susceptible to malfunction because of short-duration sags and swells, a preferred method of voltage control is to apply the required correction within a cycle of the voltage irregularity. On a 60 Hertz system, as used in the United States, the possibility exists for switching 60 times per second, which precludes the use of mechanical switching devices. Even for applications that do not require cycle-by-cycle correction, there is a growing recognition of the benefit of power conditioning using rapid switching of solid state devices.

Presently, there are static VAR compensators (SVCs) in operation which utilize computers to process line voltage data and which use solid state switches to switch compensating capacitors onto the power line to provide reactive power compensation. The solid state switches must be fired at a specific time in each cycle in order to achieve transient-free switching of the capacitors onto the power line. For correctly timed switching to occur, the firing system must be synchronized with the power line fundamental frequency. In order for this synchronization to be accomplished, the method known in the art is to determine, by direct measurement with the use of circuitry, the zero-crossings of the fundamental frequency of the line voltage or current. The problem with this widely-used technique is that an unambiguous determination of the zero crossing point is difficult when system harmonics and resonances are present. In such a case, more than one zero-crossing may occur during each cycle of the fundamental frequency.

The presence of line harmonics is growing with the increasing use of solid state power conversion equipment. The harmonic problem is especially troublesome for single-phase AC circuits, because the information available for determining the zero crossings in a three-phase power system is not available in a single-phase system.

Hardware filters can be employed to reduce the measured harmonic content in a power line signal. However, hardware filters introduce waveform lag into the control system. This lag is proportional to the amount of harmonic content which must be filtered. Thus, the response time of the firing system may become limited in systems where significant harmonics are present. Attempting to reduce the lag in the hardware filter will cause the detection of multiple zero crossings and could cause a firing of the capacitor switch at the wrong point, with attendant undesirable transients or power circuit damage.

Thus, it would be highly desirable to develop a system for accurately determining the proper instant at which to activate the switches of an SVC, a capacitor bank, or other application of fast solid state switches. The switch firing system should not be sensitive to line harmonics and should not rely upon hardware filters. In addition, it would be highly desirable to develop a solid state switch firing system that does not rely upon external synchronization signals to identify the fundamental of the line signal. Finally, it would be highly desirable to develop a solid state switch firing system that can operate on a single-phase system.

The firing system of a static VAR compensator is activated in accordance with a power conditioning control strategy. Conventional power conditioning control strategies rely upon the use of a circuit equation to calculate the amount of reactive compensation required for a line. The problem with this approach is that the power system source impedance must be known. This information is difficult to secure accurately since the source impedance on an individual power system can very dynamically as loads upstream of the regulator vary. Moreover, this quantity can vary from one power system to another.

Thus, it would be highly desirable to provide a more general control strategy which can be used on a wide variety of power systems without prior knowledge of each system's specific parameters. In addition, it would be highly desirable to provide a control strategy that is rapidly executed with low computational requirements.

SUMMARY OF THE INVENTION

The invention is a frequency domain self-synchronization controller for solid state switches. The controller analyzes a measured power signal in the frequency domain to identify a frequency domain firing angle and then converts the frequency domain firing angle to a time-domain firing signal command. The time-domain firing signal command is used to fire selected solid state switches of, for example, a static VAR compensator, precisely when the voltage across the selected solid state switches is at or near zero volts, so that the solid state switches are not damaged. The controller also calculates the line voltage level of the power system and in response to the voltage level it automatically executes either a high voltage coarse line conditioning strategy, a high voltage fine line conditioning strategy, a low voltage coarse line conditioning strategy, or a low voltage fine line conditioning strategy. Each of the line conditioning strategies is used to rapidly accomplish voltage control of the power signal on a cycle-by-cycle basis.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
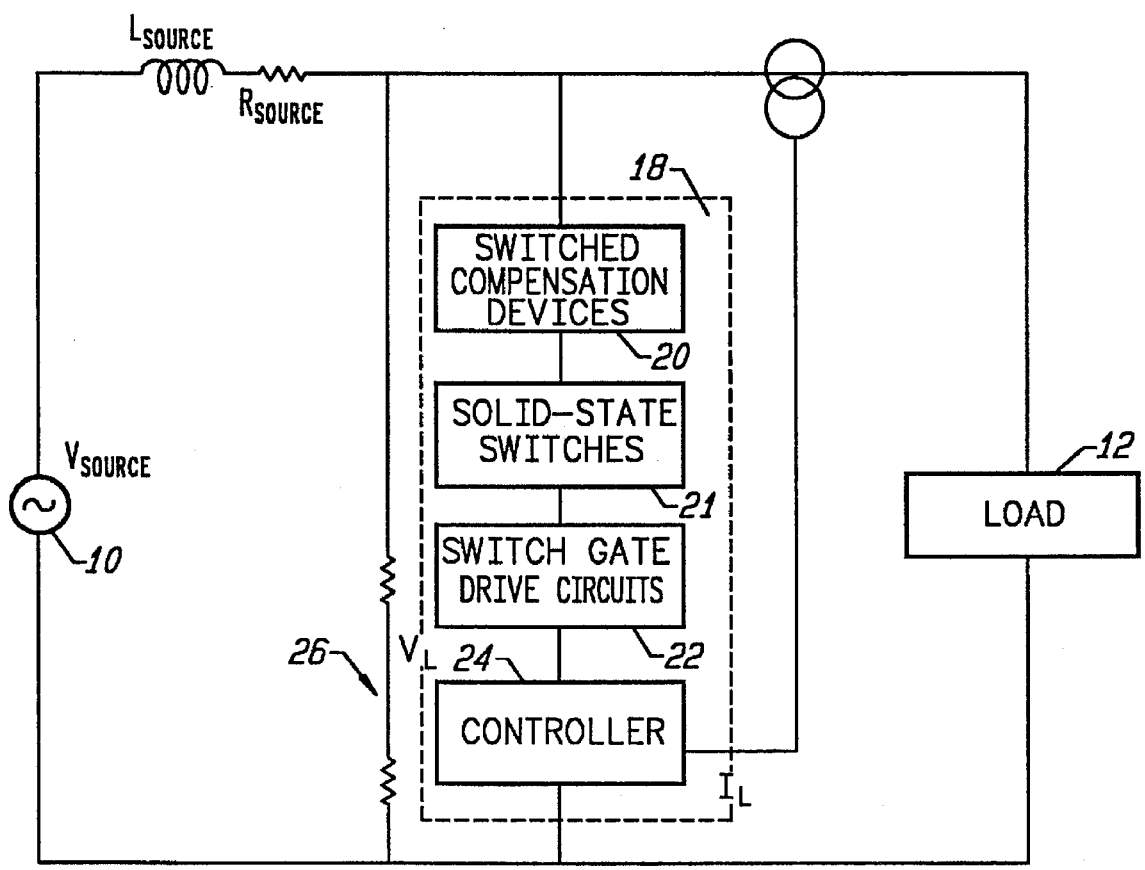
FIG. 1 is a general illustration of the controller of this invention, as embodied in an SVC.

FIG. 1 illustrates a voltage source 10 delivering power to a load 12 via power line 13. The power line 13 includes a source inductance $L_{source}$ and a source resistance $R_{source}$. The power on the power line 13 is conditioned with a Static Var Compensator (SVC) 18. The SVC 18 includes switched compensation devices 20, such as capacitors and inductors. The switched compensation devices 20 are switched by solid-state switches 21.

The SVC 18 also includes switch gate drive circuits 22. Switch gate drive circuits are generally known in the art. However, a particularly advantageous switch gate drive circuit 22 is disclosed in the patent application entitled "Current Source Gate Drive Circuit for Simultaneous Firing of Thyristors", assigned to the assignee of the present invention, and filed on the same day as the present invention, and given Ser. No. 08/267,860. The latter application is expressly incorporated by reference herein.

Figure 2:
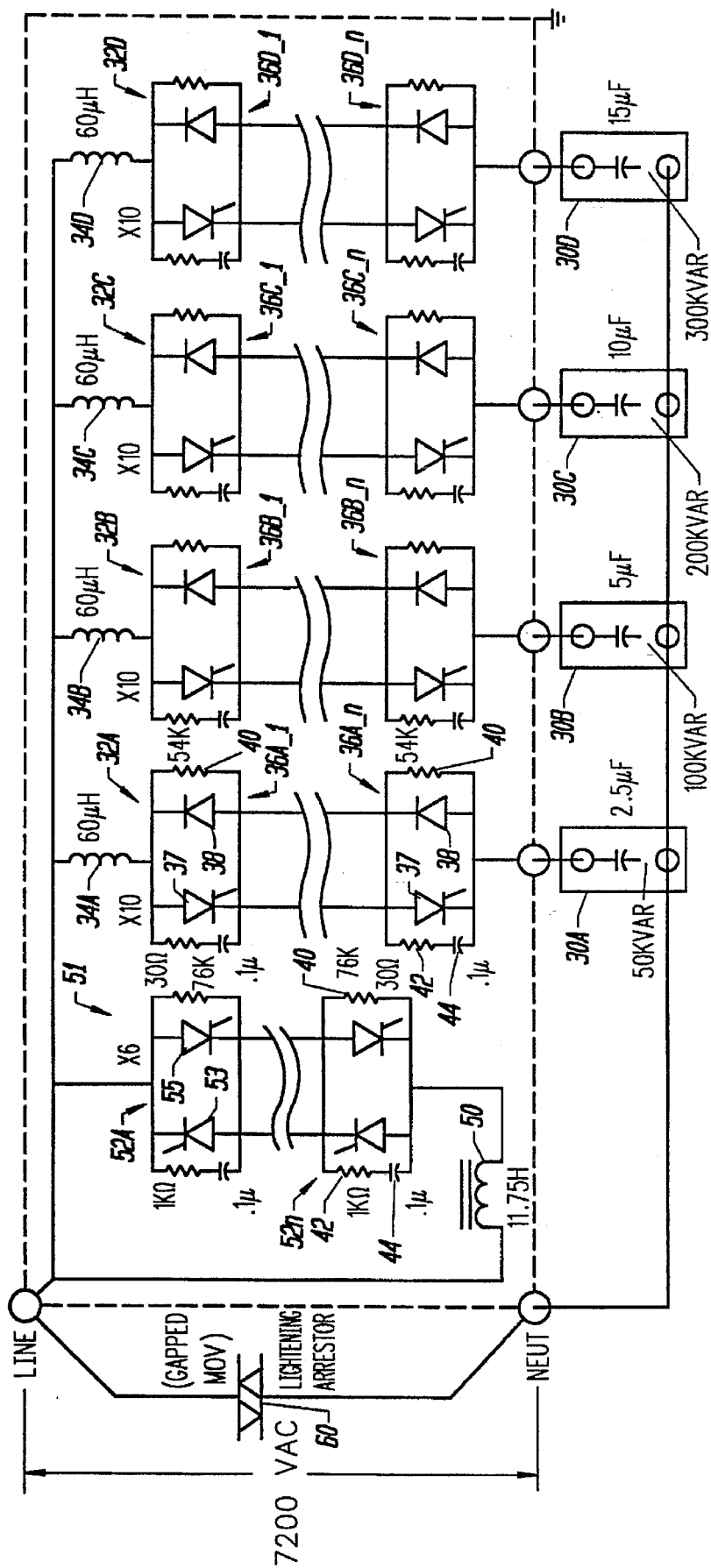
FIG. 2 is an example of a power circuit containing switched compensation devices.

The SVC 18 also includes a solid state switch controller 24 in accordance with the present invention. As will be fully described below, the controller 24 primarily has two novel aspects. The first novel aspect of the controller 24 relates to a firing system for solid state devices. Specifically, the firing system accurately fires solid state devices pursuant to a self-synchronization technique. That is, the firing system does not rely upon an external synchronization signal to determine the time which the voltage across the switch will be zero. In addition, the firing system is insensitive to line harmonics, yet does not rely upon hardware filters. The second novel aspect of the controller 24 arises in connection with its use in an SVC. Specifically, the controller 24 may be used for voltage regulation. The control strategy compares the measured line voltage to a set of voltage thresholds to select a voltage regulation strategy for rapid execution. These novel aspects of the controller 24 of the invention will be discussed in detail below. At the present time, attention turns to the switched compensation devices 20 and the solid-state switches 21 of the SVC 18. FIG. 2 serves to illustrate these features. However, the invention is not limited to the specific embodiment disclosed in FIG. 2, or to SVCs in general.

FIG. 2 illustrates a number of compensating capacitors 30A, 30B, 30C, and 30D of an SVC 18. The compensating capacitors 30 and compensating inductor 50 constitute the switched compensation devices 20 of FIG. 1.

Series thyristor strings 32A, 32B, 32C, and 32D are used to switch the respective compensating capacitors. Preferably, each series thyristor string 32 includes an isolating inductor 34, to limit in-rush current.

Each series thyristor string 32 includes a number of opposing thyristor-diode pairs 36A_1 through 36A_N. Each opposing thyristor-diode pair 36 includes a thyristor 37 in an opposing parallel relation with a diode 38. The thyristors 37 are the referenced solid state switches 21.

The diodes 38 allow the capacitors 30 to negatively charge each cycle. Preferably, each opposing thyristor-diode pair 36 includes a current leakage resistor 40 in a parallel branch and a snubber branch resistor 42 and a snubber branch capacitor 44 in another parallel branch. The current leakage resistors 40 provide for equal voltage sharing of devices in the series string. The snubber branch resistor 42 and the snubber branch capacitor 44 are used to process the inherent recovered charge of a thyristor and thereby insure that all thyristors 53 of a thyristor string 32 shut off at the same time. All thyristors in a switch of this type must be turned on simultaneously. This operation is effected by the switch gate-drive circuit 22.

The static VAR compensator 18 may also include a compensating reactor 50 that has a corresponding thyristor string 51. The thyristor string 51 includes a number of opposing thyristor pairs 52A through 52N. Each opposing thyristor pair includes a first thyristor 53 and an opposing parallel thyristor 55. The static VAR compensator 18 may also include a lightning arrestor 60. FIG. 1 illustrates that a resistive divider 26 is used to provide line voltage samples to the controller 24.

As indicated above, each of the compensating capacitors 30 are peak negatively charged each cycle. Thus, for this particular configuration of the invention, the firing system of the controller 24 must activate the thyristor strings 32 during the negative peak of the line voltage. Failure to fire the thyristor strings 32 at this precise moment may result in damage to the thyristors 37. The firing system of the controller 24 of the invention is further explained in relation to FIG. 3.

Figure 3:
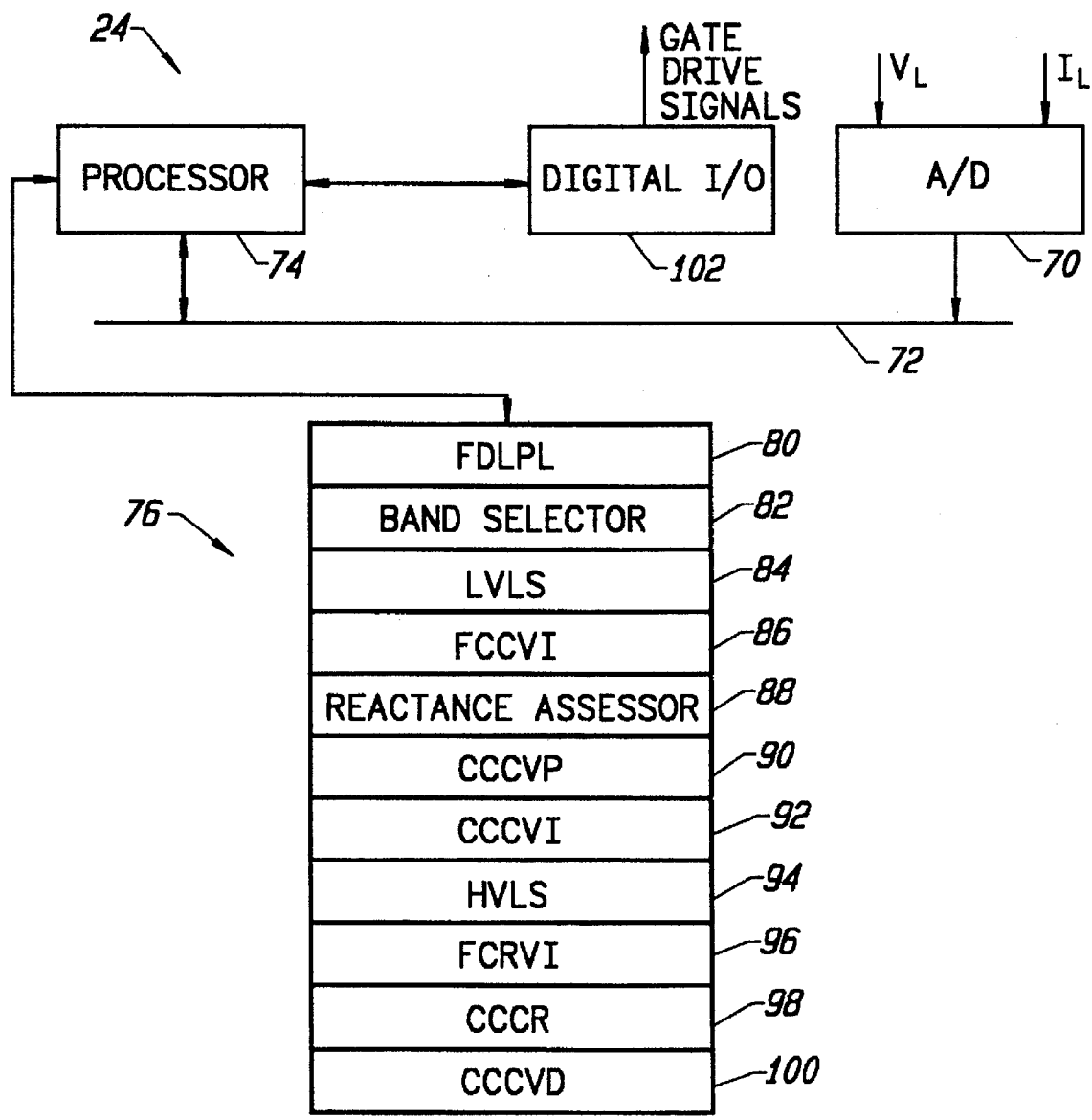
FIG. 3 is an illustration of the self-synchronizing controller of the invention.

FIG. 3 illustrates a digital embodiment of the controller 24 of the invention. The controller 24 includes an analog-to-digital (A/D) converter 70 that receives a line voltage signal $V_L$ from the resistive divider 26 of FIG. 1, and a line current signal $I_L$ from the current transformer 28 of FIG. 1. These analog signals are converted to digital signals that are applied to a system bus 72 that is in communication with a processor 74. The processor 74 interacts with a memory module 76 that includes a number of stored programs 80–100, as illustrated. The stored programs 80–100 are identified with acronyms that characterize their operation. Programs 82–100 relate to the power regulation strategy executed by the controller 24. Program 80 relates to the solid state switch firing system of the controller 24. Attention presently turns to this element.

The firing system of the controller 24 operates in connection with a frequency domain line parameter calculator (FDLPC) 80. The FDLPC 80 constitutes a set of operations that are executed by the processor 74 to produce digital firing signals that are sent via digital I/O 102 to the switch gate drive circuits 22 shown in FIG. 1.

The operations associated with the FDLPC 80 are as follows. The line voltage $V_L$ and the line current $I_L$ are continuously sampled by the A/D converter 70. Preferably, the A/D converter 70 includes a buffer memory. Data from the buffer memory is periodically passed over the system bus 72 to the processor 74. For example, one block of data may be acquired by the A/D converter 70 and then be passed to the processor 74. Thereafter, the processor 74 processes the data as will be described below, while the A/D converter continues to accumulate data for the next block. The operation is then repeated. In this manner, no loss of input data occurs and the processor data-acquisition overhead is minimized.

Each block of data is processed in accordance with the frequency domain line parameter calculator (FDLPC) 80 of the invention. The FDLPC 80 repetitively performs a single-frequency 60 Hz Discrete Fourier Transform (DFT) on successive blocks of acquired data. The DFT yields two frequency domain parameters: magnitude and phase angle. Only the phase angle of the voltage DFT is used to determine when to fire the solid state switches. While DFTs have been used in the prior art to obtain signal magnitude information, the use of the phase angle information of the DFT for determining a solid state switch firing instant is believed to be novel.

The problem with using a DFT to obtain firing signal information arises because the firing signal must be precisely timed, and therefore in the time domain, whereas the DFT operates in the frequency domain. All known prior art relies on an external synchronization signal, based in one fashion or another on the inherent timing relationship among the three phases of the power line, to determine zero crossings. In single phase systems, a phase-locked loop is used. An objective of this invention is to operate on a single phase, without reference to the three-phase line, and therefore without any external synchronization information, and without extra hardware such as phase-locked loops, to detect the zero crossings of the fundamental voltage signal.

Figure 4:
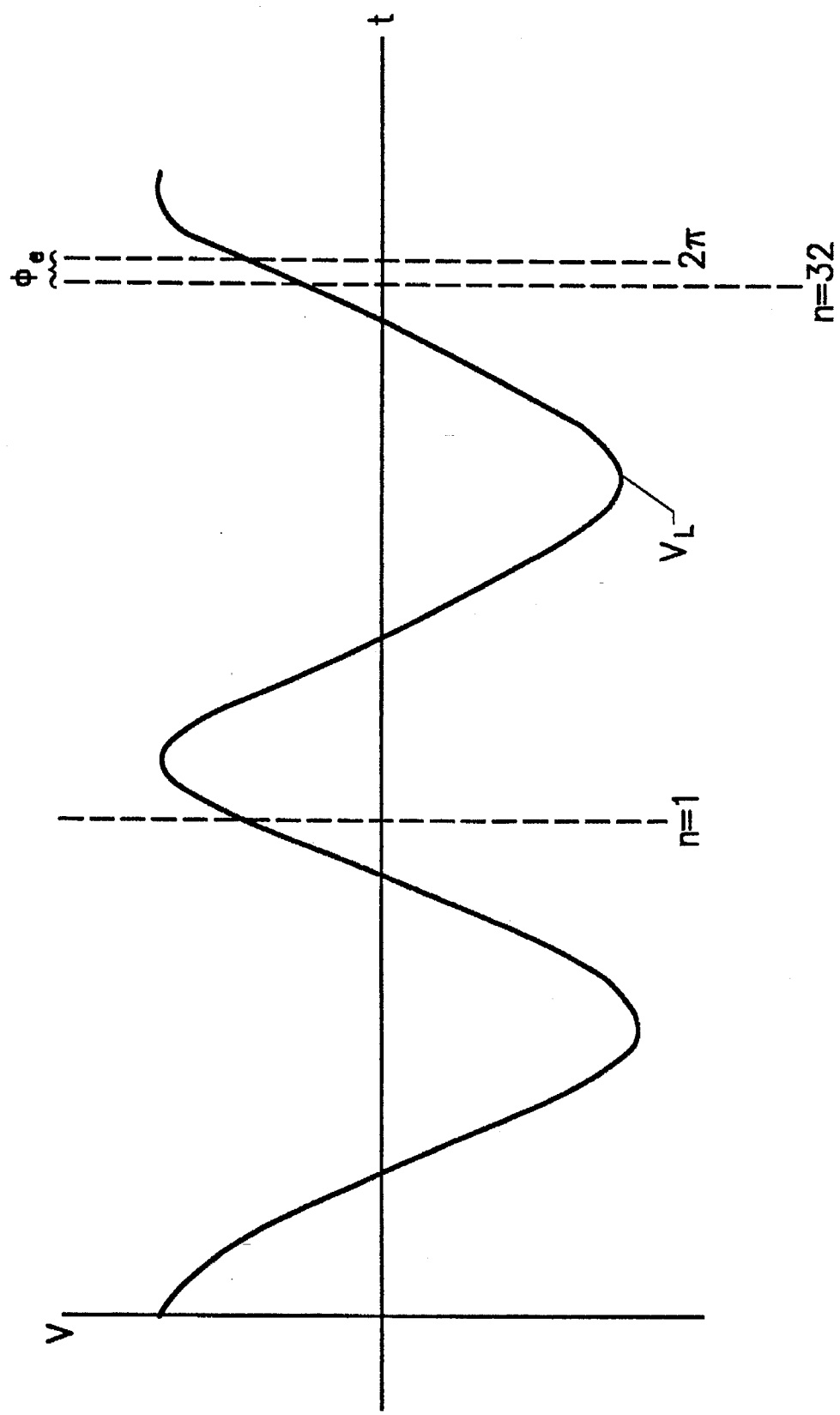
FIG. 4 illustrates the phase slip problem associated with the self-synchronizing controller of the invention.

The frequency domain processing of the invention will be described in relation to the line voltage $V_L$. FIG. 4 illustrates a line voltage signal $V_L$. At the line marked N=1 the A/D converter 70 begins sampling the line voltage for that cycle. Thirty-two samples of the line voltage are acquired in this example. However, a different number of samples may be taken as along as the Nyquist sampling criterion is satisfied. Thus, the final sample of the cycle is taken at the line in FIG. 4 marked as N=32.

Each line voltage sample is multiplied by a sine coefficient and a cosine coefficient. The respective products are then accumulated as separate sums. The resultant sum of cosine terms is proportional to the real component of the voltage phasor, whereas the resultant sum of sine-terms is proportional to the imaginary component of the voltage phasor. Thus, in accordance with the invention, the fundamental of the line voltage is constructed according to the following operation:

$$V_{real}=V_1\cos(2\pi fT)+V_2\cos[2*(2\pi fT)]+\ldots V_n\cos[N*(2\pi fT)] \quad \text{(Equation 1)}$$

$$V_{imag}=V_1\sin(2\pi fT)+V_2\sin[2*(2\pi fT)]+\ldots V_N\sin[N*(2\pi fT)] \quad \text{(Equation 2)}.$$

In the above equations, f is the DFT frequency, T is the time interval between samples and N is the total number of samples in each summation. V1, V2, ... and $V_N$ are the line voltage samples. Equations (1) and (2) are calculated at a single frequency, f, which by way of example will be assigned 60 Hz, the nominal power signal frequency in the United States. Note that this technique is insensitive to line harmonics.

To ideally implement the DFT using equations (1) and (2), the product of the constant parameters f, N and T will exactly equal 1. The value of N is set to 32 which enables highly accurate 60 Hz DFT data to be obtained. Consequently, for a line frequency of 60 Hz, the value of T equals 520.833 microseconds, but in practice a 520 microsecond value is used due to limitations in the sampling hardware. This results in a discrepancy of 26.666 microseconds every 60 Hz cycle. This discrepancy is called a sampling-error discrepancy, denominated $\phi_e$, and is illustrated in FIG. 4.

In accordance with the invention, the previously calculated real and imaginary voltage terms are used to calculate the phase angle, $\phi_v$, of the line voltage phasor. This operation is performed according to the following equation:

$$\phi_v = \arctan(V_{imag}/V_{real}) \quad \text{(Equation 3)}.$$

The voltage phaser phase angle $\phi_v$ can be considered the angular displacement of the line voltage's fundamental frequency component sinusoid (which is shown as $V_L$ in FIG. 5) from a time-shifted cosine function (which is shown as $V_s$ in FIG. 5) of the same frequency but having its origin coinciding with the first sample instant.

The calculated phase angle, $\phi_v$, will not be constant from cycle to cycle since the summations of equations (1) and (2) are not explicitly synchronized to the line frequency. In other words, the sampling error discrepancy shown in FIG. 4 causes the calculated phase angle, $\phi_v$, to continually change by 0.01 radians per cycle, which is the angle corresponding to the 26.666 microsecond discrepancy described above.

As previously indicated, it is necessary to fire the thyristors when the voltage across them is at or near zero, otherwise a large in-rush current will be produced that can damage the thyristors 37 and capacitors 30. Since the calculated phase angle is continuously changing, a synchronized approach to thyristor firing is not available. Instead, a self-synchronizing operation must be executed in accordance with the invention. This self-synchronization operation involves the use of the calculated phase angle, $\phi_v$, and an offset angle, as will be described below.

As previously discussed, the arrangement of the solid state devices 20 causes the capacitors to be negatively charged each cycle. Therefore, in this configuration, it is necessary to fire the thyristors at the negative peak line voltage. This occurs at an angular displacement, or offset angle, of $\pi$ radians relative to a cosine function originating at the first sample instant. Since this point occurs at the negative peak of the reference function for the DFT voltage phase angle, it is necessary to add the offset angle of $\pi$ radians to the phase angle, $\phi_V$, calculated by equation (3) to obtain the displaced phase angle, $\phi_D$, also called the frequency domain firing angle. This operation may be defined follows:

$$\phi_D = \phi_V + \pi \qquad \text{(Equation 4)}.$$

Figure 5:
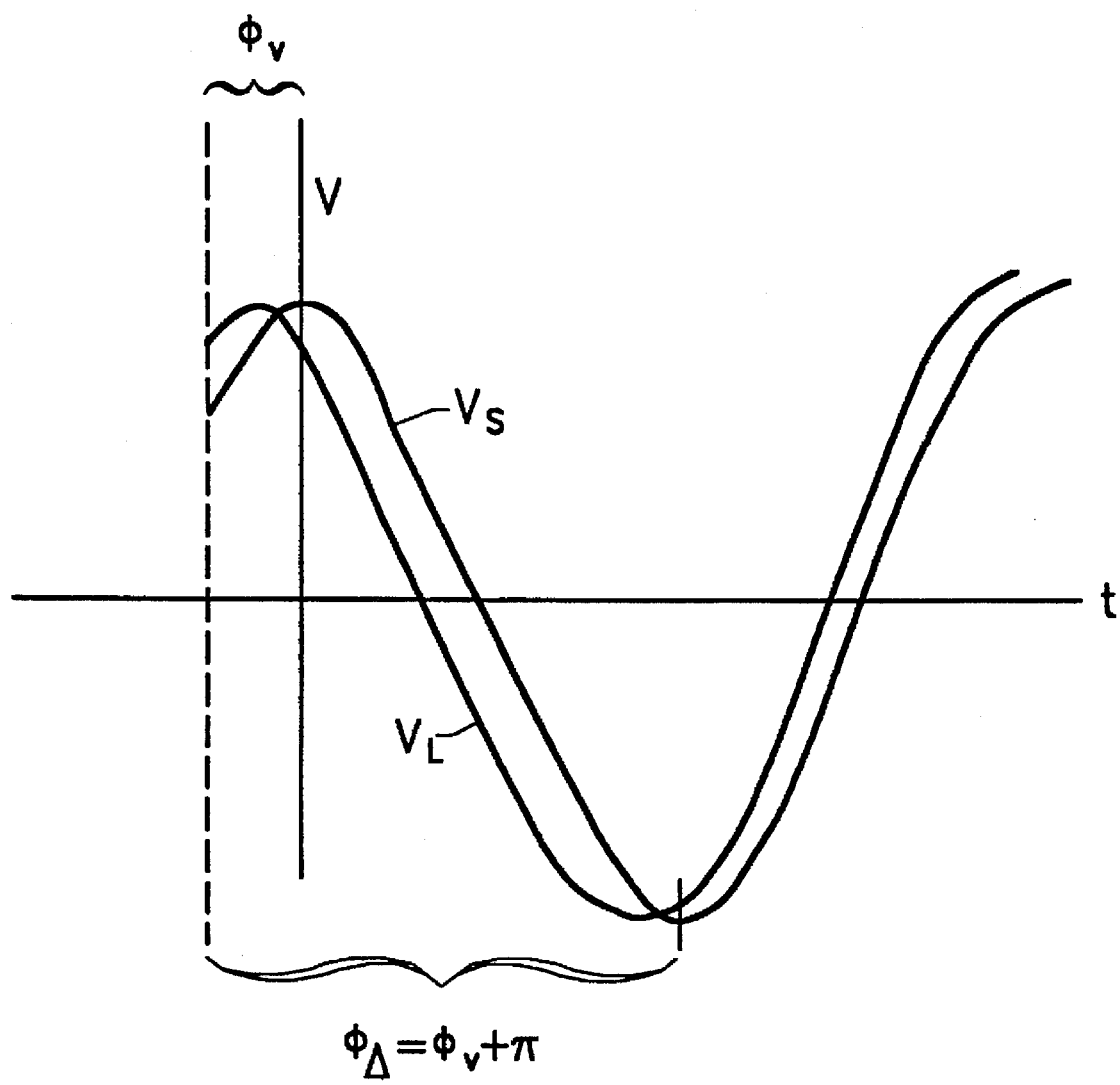
FIG. 5 illustrates the phase compensation technique of the self-synchronizing controller of the invention.

The displaced phase angle $\phi_D$ is illustrated in FIG. 5. Note that the displaced phase angle $\phi_D$ is directly proportional to time since the nominal frequency of the line voltage is constant. At 60 Hz, for example, the period of 1 cycle equals 16.66 milliseconds. Therefore, the displaced phase angle of the line voltage is used to predict the next time instant at which the fundamental component of the line voltage will be at a specific value. Specifically, a firing time, $T_F$, when the voltage sinusoid will be at its most negative value for correct thyristor firing, is defined as follows:

$$T_F = \phi_D/(2\pi 60) \qquad \text{(Equation 5)}$$

Equation 5 requires that the displaced phase angle, $\phi_D$, be a positive quantity, not greater than $2\pi$ radians. Since the angle is modulo $2\pi$, it is reduced, when necessary, to a value between 0 and $2\pi$ radians. Note that the results of this teaching are not affected by line harmonics.

The value obtained from equation (5) is used to set an internal timer in processor 74. When the timer expires, the processor 74 generates digital firing signals that are sent to the digital I/O 102. From the digital I/O 102, the signals are processed by the switched gate drive circuits 22 and eventually fire the solid state switches 21.

The firing time $T_F$ is adjusted to account for the computation time associated with the foregoing calculations. The thyristors are able to be fired every cycle regardless of the point in time at which the last sample of the previous cycle is taken.

The firing system of the controller 24 of the invention has now been described. Attention presently turns to the other operations that are performed by the frequency domain line parameter calculator (FDLPC) 80 of the invention. The magnitude of the line voltage phase may be calculated from the $V_{real}$ and $V_{imag}$ quantities as follows:

$$V_{mag} = [(V_{real})^2 + (V_{imag})^2]^{1/2} \qquad \text{(Equation 6)}$$

It should be appreciated that the identical calculations can be made for the line current $I_L$, to yield the corresponding quantities, $I_{imag}$, $I_{real}$, $I_{mag}$ and $\phi_I$. When this is done, a power factor angle $\phi_{PF}$ may be calculated as follows:

$$\phi_{PF} = \phi_V - \phi_I \qquad \text{(Equation 7)}$$

The power factor (PF) may then be calculated as follows:

$$PF = \cos(\phi_{PF}) \qquad \text{(Equation 8)}$$

Finally, the reactive power may then be calculated as follows:

$$Q = V_{mag} I_{mag} \sin(PF) \qquad \text{(Equation 9)}$$

This operation is performed by the reactance assessor 88, which will be discussed below.

These additional quantities derived by the frequency domain line parameter calculator (FDLPC) 80 may be used in conjunction with the control strategy executed by the controller 24 of the invention. Attention presently turns to this second novel aspect of the invention.

Figure 6:
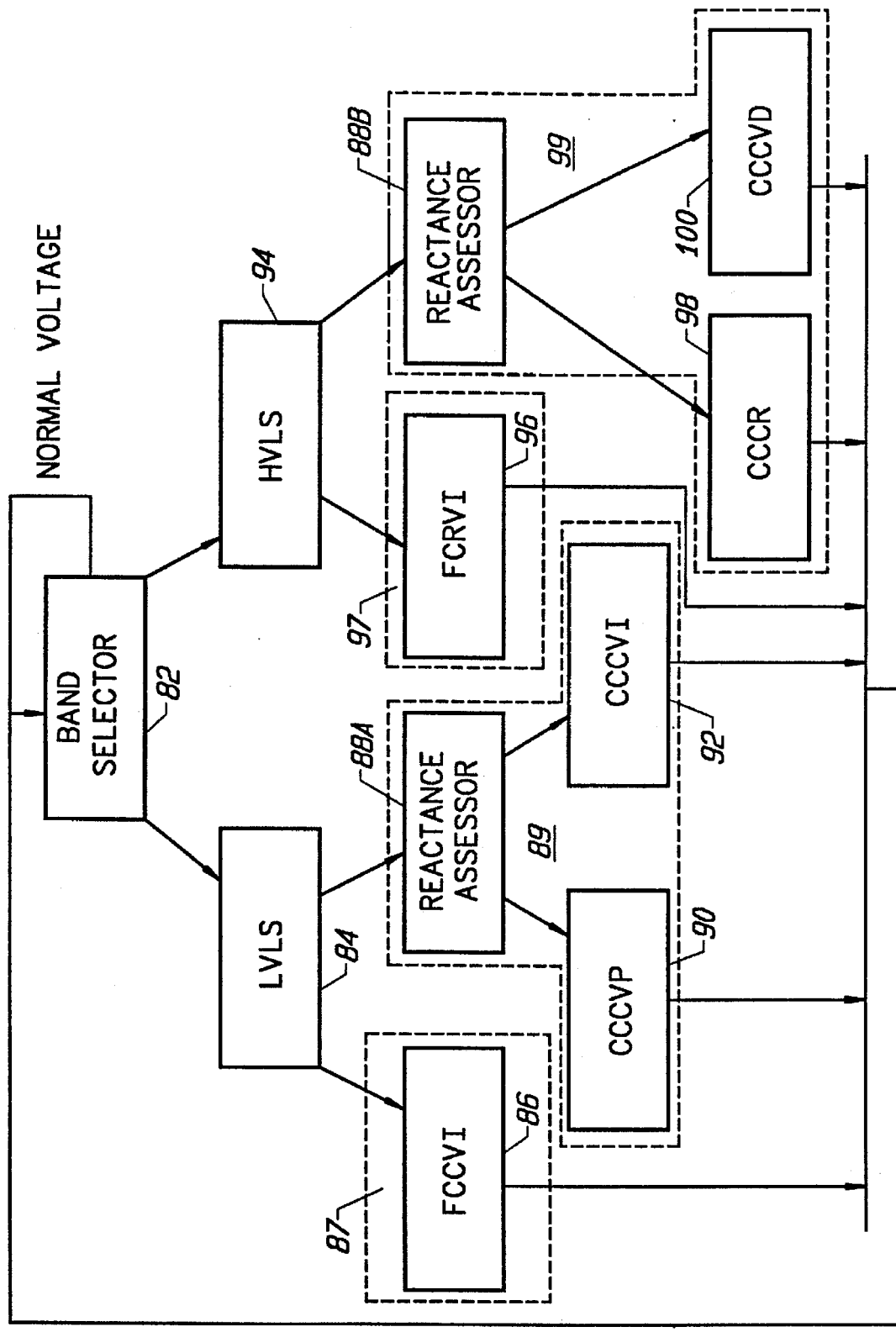
FIG. 6 illustrates the voltage regulation control strategy of the invention implemented as a binary decision tree.

As previously indicated, the controller 24 of the invention executes a voltage control strategy. The control strategy is disclosed in relation to FIGS. 6 and 7. FIG. 6 illustrates a binary decision tree control strategy used in accordance with the invention. The binary decision tree control strategy identifies a line voltage level and then executes a control strategy based upon the line voltage level. Initially, a voltage band is selected by the band selector 82. The band selector can characterize the line voltage level ($V_L$). If the line voltage is within a tolerance band, then normal line voltage exists and the controller loops upon itself back to node 82. If the line voltage is beneath a low voltage threshold, then a low voltage processing branch is taken to the low voltage level selector (LVLS) 84.

The LVLS 84 compares the line voltage to a low voltage coarse threshold value to select between fine low voltage processing and coarse low voltage processing. The fine low voltage processing option is selected if the line voltage is above the coarse threshold value. In this case, a fine compensating capacitive VAR incrementor (FCCVI) 86 is called to execute a low voltage fine line conditioning strategy 87. Specifically, the FCCVI 86 adds one increment of compensating capacitive VAR demand to the existing compensating capacitive VAR demand. An "increment" of compensating capacitive VAR is equivalent, in this example, to 50 KVAR. Thus, if in a previous cycle compensating capacitor 30A was fired, and then the measured voltage level resulted in the fine compensating capacitive VAR incrementor (FCCVI) 86 being called, then compensating capacitor 30B would be fired the next cycle.

Returning to the LVLS 84 of FIG. 6, if the low voltage level selector finds the line voltage to be below the low voltage coarse threshold value, then a low voltage coarse line conditioning strategy 89 is pursued. The first operation to be performed in the low voltage coarse line conditioning strategy 89 is to determine the line reactance with the reactance assessor 88A. As previously indicated, the reactance assessor 88A executes the operation of Equation 9 to obtain the load reactance. The reactance assessor 88A then adds the existing compensating VAR demand to the calculated load reactance to obtain a line reactance value.

In the relatively unusual case in which there is low line voltage and the line reactance value is capacitive, then a coarse compensating capacitive VAR processor (CCCVP) 90 is selected. The CCCVP 90 adds one increment of compensating capacitive VAR to the existing compensating capacitive VAR demand.

In the more common case in which there is a low line voltage and the line reactance value is inductive, then a coarse compensating capacitive VAR incrementor (CCCVI) 92 is called. THE CCCVI 92 preferably performs two operations. First, it selects a compensating capacitive VAR value to cancel the load inductive VAR. It does this by providing the next highest capacitive VAR value to cancel the load inductive VAR. Next, it adds one increment of compensating capacitive VAR to the new compensating capacitive VAR value. The increment of capacitive VAR is not applied if the increment exceeds the compensating capacity of the SVC.

Returning now to the band selector 82, if the band selector finds a high line voltage condition, then the high voltage level selector 94 is called. If the line voltage is below a high voltage coarse threshold, then fine compensating reactive VAR incrementor (FCRVI) 96 is selected. The FCRVI 96 executes a high voltage fine line conditioning strategy 97 by adding one increment of compensating inductive VAR to the existing compensating inductive VAR value. For example, the compensating reactor 50 of FIG. 2 may be phased to provide an additional 10% of the inductive VARs rating of the reactor 50. If the reactor is providing its maximum inductive VARS and the inductive compensation is still insufficient, then one compensating capacitor is removed and the reactor is phased to 10% of its inductive VAR rating. This operation is equivalent to phasing the reactor to 10% beyond its inductive VAR rating.

If the high voltage level selector 94 finds that the line voltage is above the high voltage coarse threshold, then the a high voltage coarse line conditioning strategy is followed. This operation entails a call to the reactance assessor 88B. The reactance assessor 88B first determines whether the line reactance is inductive or capacitive. This is done by relying upon the calculation of Equation 9, as previously discussed, or an equivalent operation. Equation 9 yields a load reactance value. The line reactance is obtained by adding the load reactance and the existing VAR demand. If the line reactance is inductive, then the coarse compensating capacitance remover (CCCR) 98 is selected. If there is existing capacitive compensation demand, then the CCCR 98 removes it. If no compensating capacitors are presently being switched across the line, then the CCCR 98 phases the reactor to its maximum inductive reactive value. The effect in both cases is a net decrease in compensating capacitive VARs.

In the more common case where there is high line voltage and the line is capacitive, the coarse compensating capacitive VAR decrementor (CCCVD) 100 is selected. The CCCVD 100 first determines whether a compensating reactive capacitance demand exists. If so, then the existing compensating reactive capacitance demand is removed by the CCCVD 100. Otherwise, the reactor 50 may be completely phased for maximum inductive reactance.

Figure 7:
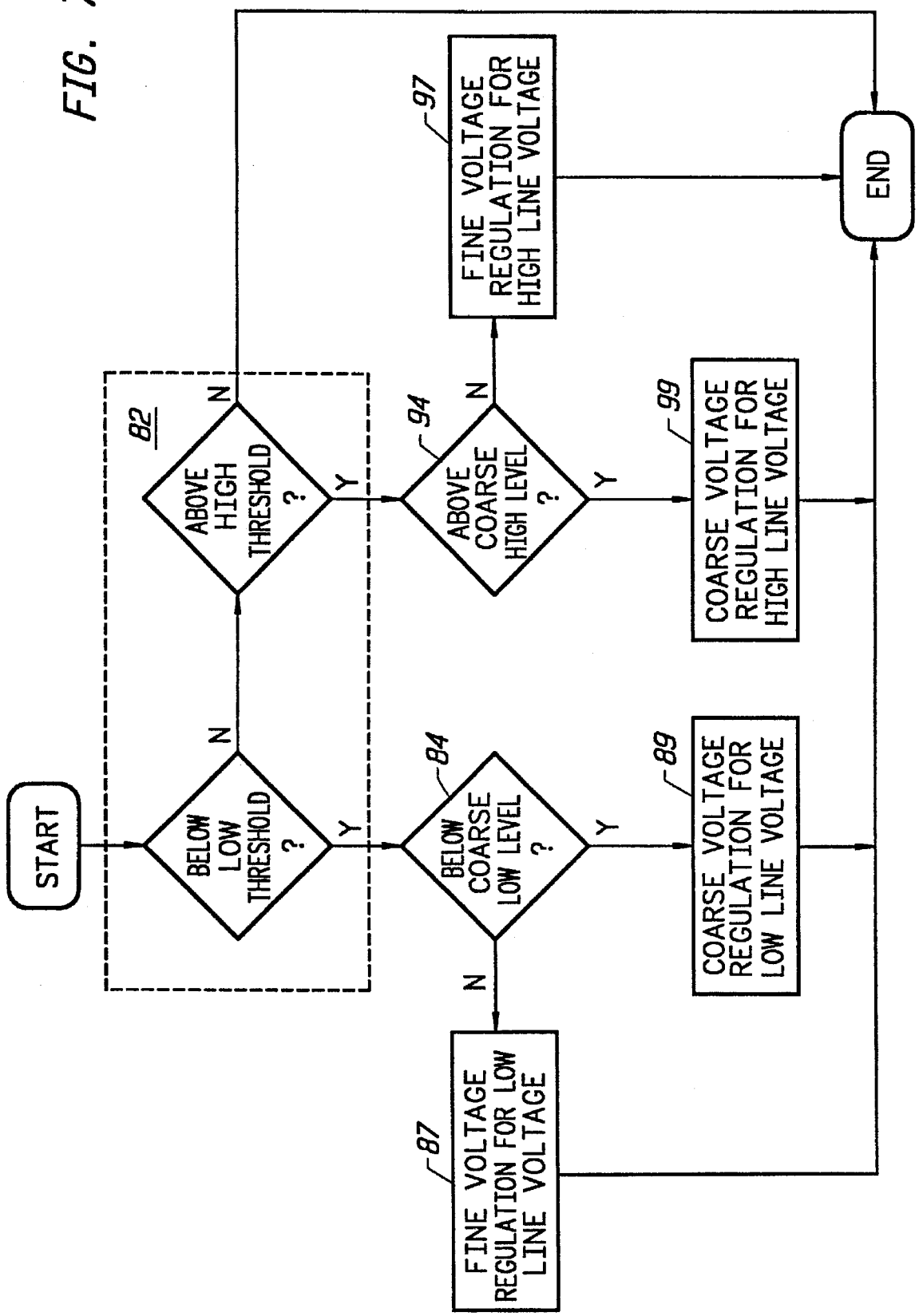
FIG. 7 illustrates the voltage control strategy of the invention implemented in the form of a flow chart.

FIG. 7 shows the equivalent operations of FIG. 6, but in the form of a flow chart, which is less detailed. It will be appreciated by those skilled in the art that the methodology disclosed in relation to FIGS. 6 and 7 results in the rapid execution of the invention's voltage control strategy. Moreover, the control strategy is executed with minimal computational overhead.

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, the invention is disclosed in relation to negatively charged capacitors. Slight modifications to the foregoing techniques are required when a different physical configuration is used.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A circuit for firing solid state devices, comprising:
   a power line output node for connection to a power line carrying a power signal;
   a parameter measurement circuit to continuously sample said power signal and obtain a measured power signal;
   a power compensation element;
   a plurality of solid state devices connected between said power compensation element and said power line output node; and
   a self-synchronizing controller connected to said parameter measurement circuit and said plurality of solid state devices to analyze said measured power signal in the frequency domain to identify a frequency domain firing angle and to convert said frequency domain firing angle to a time-domain firing signal command that is applied to said solid state devices to provide selected power conditioning to said power signal.

2. The circuit of claim 1 wherein said frequency domain firing angle is derived from a phase angle.

3. The circuit of claim 2 wherein said frequency domain firing angle is derived by adding an offset angle to said phase angle.

4. The circuit of claim 3 wherein said phase angle is identified through digital Fourier transforms of said power signal.

5. A static VAR compensator, comprising:
   a power line output node for connection to a power line carrying a power signal;
   a parameter measurement circuit to continuously sample said power signal and obtain a measured power signal;
   a plurality of compensating capacitors, with associated increment VAR values;
   a compensating inductor;
   a plurality of thyristor strings each of said thyristor strings connecting a selected compensating capacitor of said plurality of compensating capacitors to said power line output node to provide capacitive reactive power conditioning to said power signal, one of said plurality of thyristor strings connecting said compensating inductor to said power line output node to provide inductive reactive power conditioning to said power signal;
   a plurality of gate drive circuits corresponding to said plurality of thyristor strings to fire said plurality of thyristor strings; and
   an SVC controller that assesses the voltage level of said measured power signal and in response thereto selectively executes either
   a high voltage coarse line conditioning strategy,
   a high voltage fine line conditioning strategy,
   a low voltage coarse line conditioning strategy, or
   a low voltage fine line conditioning strategy, each of said line condition strategies including a corresponding set of gate drive signals that are applied to selected gate drive circuits of said plurality of gate drive circuits to accomplish selective reactive power conditioning of said power signal.

6. The static VAR compensator of claim 5 wherein said high voltage coarse line conditioning strategy generates gate drive signals to isolate said compensating capacitors of said plurality of compensating capacitors from said power line output node when a compensating reactive capacitance demand exists.

7. The static VAR compensator of claim 5 wherein said high voltage coarse line conditioning strategy generates gate drive signals to force said reactor to provide maximum inductive reactance.

8. The static VAR compensator of claim 5 wherein said high voltage fine line conditioning strategy generates gate drive signals to produce an incremental increase in the reactive compensation provided by said compensating inductor.

9. The static VAR compensator of claim 5 wherein said low voltage coarse line conditioning strategy generates gate drive signals to force said plurality of compensating capacitors to cancel existing line inductive VARs of said power signal.

10. The static VAR compensator of claim 9 wherein said low voltage coarse line conditioning strategy generates gate drive signals to connect a selected compensating capacitor of said plurality of compensating capacitors to said power line output node to obtain an incremental increase in capacitive compensation.

11. The static VAR compensator of claim 5 wherein said low voltage coarse line conditioning strategy generates gate drive signals to connect a selected compensating capacitor of said plurality of compensating capacitors to said power line output node to obtain an incremental increase in capacitive compensation.

12. The static VAR compensator of claim 5 wherein said low voltage fine line conditioning strategy generates gate drive signals to connect a selected compensating capacitor of said plurality of compensating capacitors to said power line output node to obtain an incremental increase in capacitive compensation.

13. A static VAR compensator, comprising:

a power line output node for connection to a power line carrying a power signal;

a parameter measurement circuit to continuously sample said power signal and obtain a measured power signal;

a plurality of compensating capacitors, with associated increment VAR values;

a compensating inductor;

a plurality of thyristor strings each of said thyristor strings connecting a selected compensating capacitor of said plurality of compensating capacitors to said power line output node to provide capacitive reactive power conditioning to said power signal, one of said plurality of thyristor strings connecting said compensating inductor to said power line output node to provide inductive reactive power conditioning to said power signal;

a plurality of gate drive circuits corresponding to said plurality of thyristor strings to fire said plurality of thyristor strings; and a self-synchronizing SVC controller connected to said parameter measurement circuit and said plurality of gate drive circuits to analyze said measured power signal in the frequency domain to identify a frequency domain firing angle and to convert said frequency domain firing angle to a time-domain firing signal command to be applied to selected gate drive circuits of said plurality of gate drive circuits to selectively execute either a high voltage coarse line conditioning strategy, a high voltage fine line conditioning strategy, a low voltage coarse line conditioning strategy, or a low voltage fine line conditioning strategy, to accomplish selective reactive power conditioning for said power signal.

14. The static VAR compensator of claim 13 wherein said frequency domain firing angle is derived from a phase angle.

15. The static VAR compensator of claim 14 wherein said frequency domain firing angle is derived by adding an offset angle to said phase angle.

16. The static VAR compensator of claim 15 wherein said phase angle is identified through digital Fourier transforms of said power signal.

* * * * *